United States Patent
Campbell

[11] Patent Number: 6,092,854
[45] Date of Patent: *Jul. 25, 2000

[54] MAT WITH INTEGRAL WIRE HARNESS FASTENER AND CHANNEL

[75] Inventor: Michael T. Campbell, Grand Rapids, Mich.

[73] Assignee: Cascade Engineering, Inc., Grand Rapids, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/003,656

[22] Filed: Jan. 7, 1998

Related U.S. Application Data

[60] Provisional application No. 60/035,230, Jan. 8, 1997.

[51] Int. Cl.[7] ............................................. B62D 25/14
[52] U.S. Cl. ................................... 296/70; 180/90
[58] Field of Search ....................... 296/39.3, 39.1, 296/70, 208, 146.7, 214, 191; 180/90; 49/502; 439/34

[56] References Cited

U.S. PATENT DOCUMENTS

| | | | |
|---|---|---|---|
| 4,815,984 | 3/1989 | Sugiyama et al. | 296/146 |
| 5,322,722 | 6/1994 | Rozenberg | 296/191 |
| 5,460,530 | 10/1995 | Toba et al. | 439/34 |
| 5,846,091 | 12/1998 | Nishijima et al. | 439/34 |
| 5,854,452 | 12/1998 | Campbell et al. | 181/290 |
| 5,884,961 | 3/1999 | Serzawa et al. | 296/146.7 |
| 5,897,157 | 4/1999 | Yamaguchi et al. | 296/146.7 |

FOREIGN PATENT DOCUMENTS

| | | |
|---|---|---|
| 30 30 449 | 3/1982 | Germany . |
| 35 22 203 | 1/1987 | Germany . |
| 37 02 629 | 8/1988 | Germany . |
| 40 33 804 | 4/1992 | Germany . |
| 41 24 023 | 1/1993 | Germany . |
| 43 26 869 | 1/1995 | Germany . |
| WO 93/15932 | 8/1993 | Japan . |

*Primary Examiner*—D. Glenn Dayoan
*Assistant Examiner*—Lori L. Coletta
*Attorney, Agent, or Firm*—Rader, Fishman, Grauer & Mc Garry, An Office of Rader, Fishman & Grauer PLLC

[57] ABSTRACT

A dash mat for blocking the transfer of sound from a vehicle engine compartment, through a firewall, and into a passenger compartment. The dash mat being mounted to the firewall and comprising a planar sheet in which is formed a channel for receiving a vehicle accessory, such as a wiring harness, and a pair of resilient fingers positioned on opposite sides of and overlying the channel to hold the vehicle accessory within the channel.

25 Claims, 4 Drawing Sheets

MAT WITH INTEGRAL WIRE HARNESS FASTENER AND CHANNEL

CROSS REFERENCE TO RELATED APPLICATIONS

Applicants claims the benefit of provisional application Ser. No. 60/035,230, filed Jan. 8, 1997.

BACKGROUND OF THE INVENTION

1. Field of the Invention

This invention relates to mats with fasteners for securing elongate objects thereto; and, more particularly, to dash mats for vehicles having integral fasteners for securing electrical wire harnesses thereto and to a system for fastening together and acoustically sealing two vehicle dash mat pieces.

2. Description of the Related Art

In most contemporary automobiles, a steel firewall separates the engine compartment from the passenger compartment. To reduce the transmission of sound from the engine compartment through the firewall and into the passenger compartment, a sound barrier mat (otherwise known as a dash mat) is typically constructed of an elastomeric material and is mounted to and substantially overlies the firewall.

A wiring harness is typically arranged along a portion of the dash mat and extends from a fuse box to various components, such as radios, switches, lights, gauges, etc., within the passenger compartment. An outer surface of the dash mat is typically in contact with a bottom surface of the vehicle carpet and extends beyond the carpet to an upper portion of the firewall behind the instrument panel. It is common practice to secure the wiring harness to component mounting brackets, cable sheaths, and other protrusions within the passenger compartment via cable ties. It is also common to install the wiring harness to the sheet metal of a vehicle through Christmas-tree type push fasteners having a holding ring on an outer end of the fastener for receiving the wiring harness. It is often difficult to manipulate the cable ties and push fasteners in tight places, and the individual wires in the wiring harness can be undesirably strained while being secured. The mounting of wires in this manner is inefficient and leads to non-uniformity from vehicle to vehicle during assembly, since different protrusions within the passenger compartment from vehicle to vehicle may be used for securement. In addition, sharp edges resulting from excess material being trimmed from the installed cable ties can cause injury to repair personnel or others.

Different cable tie sizes are often required during wire harness assembly due to different wire harness configurations and the particular vehicle protrusions to which they are attached. The different sized cable ties result in a greater number of parts, and the use of cable ties results in a longer assembly time than desired.

Furthermore, apertures are formed in the dash mat and are aligned with openings in the firewall for the passage of cable guides, wiring harnesses, steering columns, accessory mounts, and the like. Since the dash mat is designed to insulate the passenger compartment from engine compartment noise, it is desirable to size the apertures as small as possible to fir snugly around the various elements projecting through the apertures without compromising the ease and efficiency of install such elements. One difficult area is the opening formed in the dash mat for receiving the steering column, which is typically quite large when compared to other openings in the dash mat. Maintaining the noise reduction qualities of the mat in this area is difficult due to the size of the opening. Typically, a modular plate barrier, which is provided with a smaller steering column and mounting apertures, is used to cover the larger dash mat opening. After installation of the steering column and instrument panel, it is desirable to securely seal the modular plate barrier to the rest of the dash mat.

SUMMARY OF THE INVENTION

The invention relates to a dash mat and a fastener therefor. The dash mat is adapted for use in a motor vehicle having a firewall separating an engine compartment from a passenger compartment having a an elongated article. The dash mat is adapted to mount to the firewall and comprises a planar sheet that dampens sound passing from an engine compartment, through a firewall, and into the passenger compartment. A channel is provided on the planar sheet and is sized to receive an elongated article. A fastener, also provided on the planar sheet, holds an elongated article in the channel.

Preferably, the fastener is a snap-fit fastener that releasably holds a vehicle accessory within the channel and comprises a resilient finger that overlies and holds the vehicle accessory within the channel. The fastener can comprise multiple fingers, preferably mounted on opposite sides of the channel and are integrally molded with the planar sheet.

Preferably, the channel has a depth greater than the height of the vehicle accessory so that a vehicle accessory lies beneath an upper surface of the planar sheet when it is received within the channel.

BRIEF DESCRIPTION OF THE DRAWINGS

The invention will now be described with reference to the drawings in which.

DETAILED DESCRIPTION OF THE PREFERRED EMBODIMENTS

Figure 1:
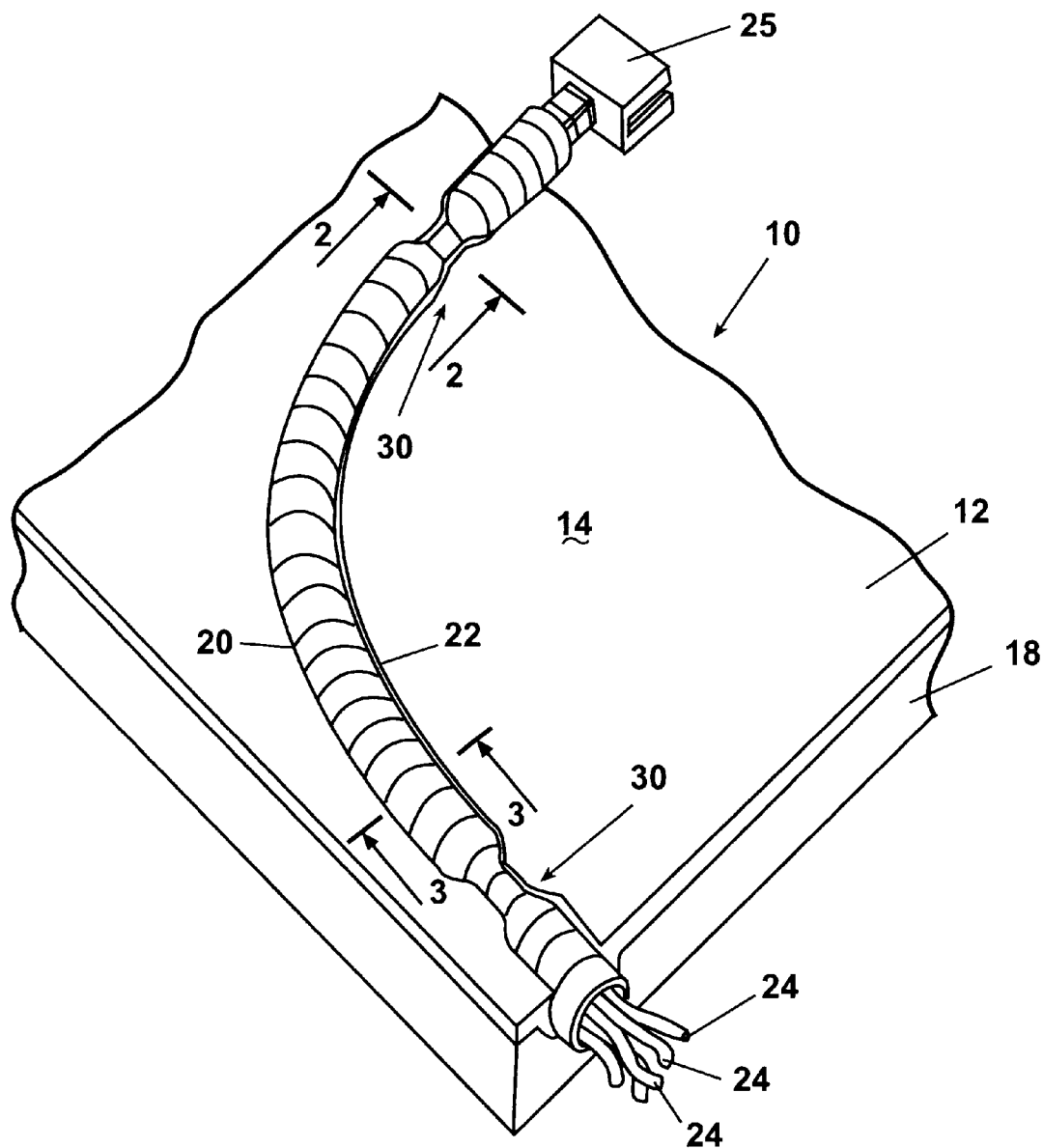
FIG. 1 is a perspective view of a portion of a vehicle dash mat assembly having an integrally molded channel and integrally molded fasteners according to the invention.
Figure 2:
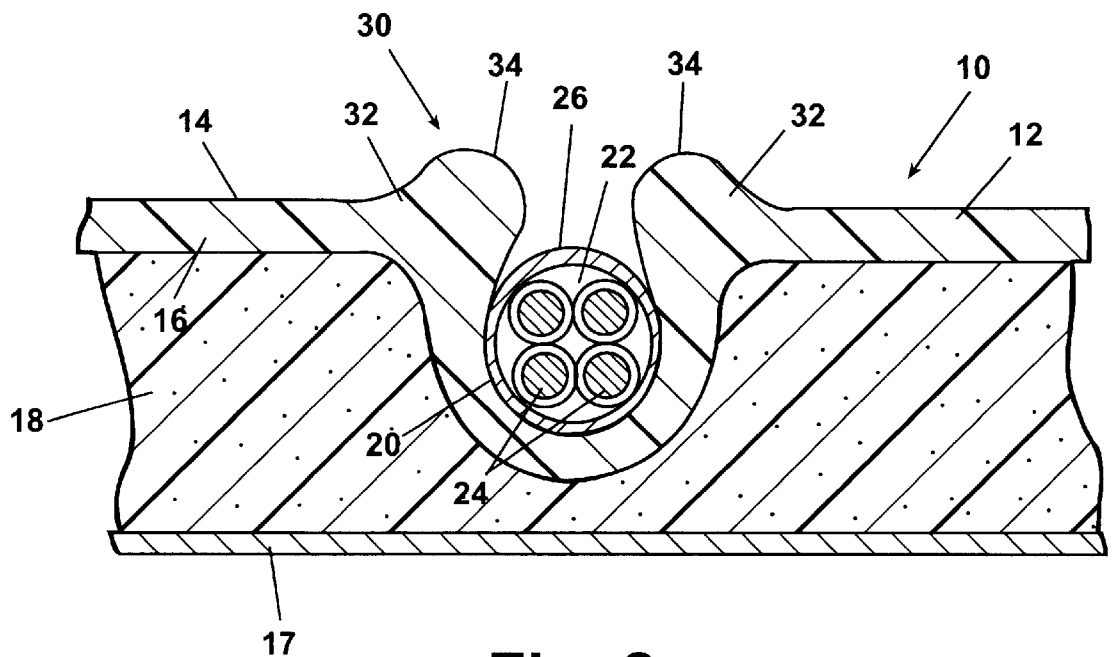
FIG. 2 is a cross sectional view taken along line 2—2 of FIG. 1 illustrating a portion of the vehicle dash mat and integral fastener.
Figure 3:
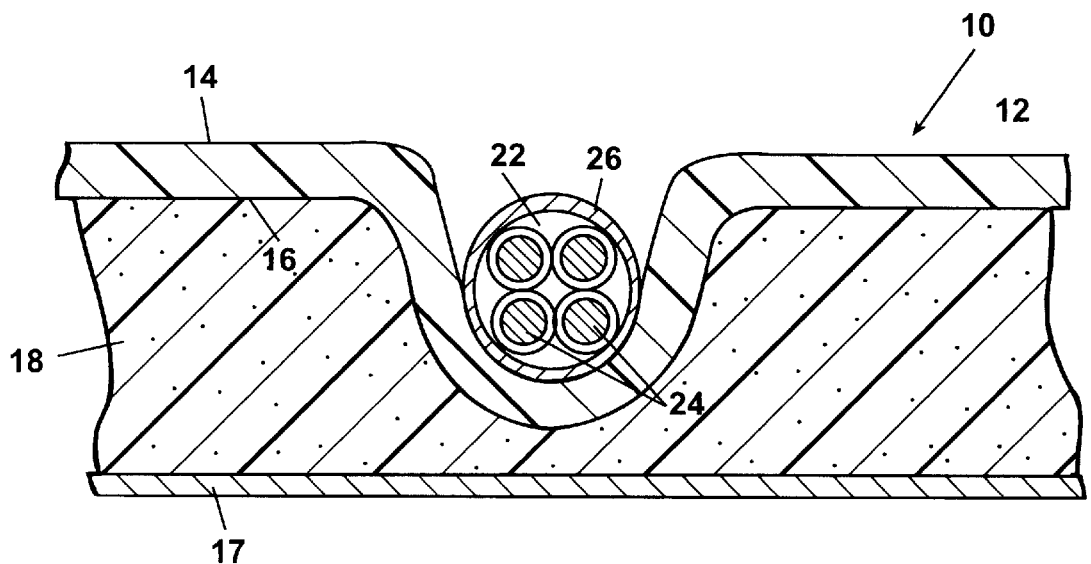
FIG. 3 is a cross sectional view taken along line 3—3 of FIG. 1 illustrating a portion of the vehicle dash mat and integral channel.

Referring now to FIGS. 1–3 mat assembly 10 includes an outer sound barrier mat or planer sheet 12 having a first outer surface 14 and a second inner surface 16. The sound planar sheet 12 is preferably formed of a relatively stiff elastomeric material, that is approximately 2 mm in thickness. The outer surface 14 of the planer sheet 12 faces the underside of a vehicle carpet (not shown) and typically extends past the carpet behind the instrument panel while the inner surface 16 faces the vehicle firewall 17. A foam layer 18 can be attached to the inner surface 16 and abut the firewall 17 when the dash mat assembly 10 is installed for further insulating the passenger compartment from the engine compartment.

An elongate channel 20 is molded into the planer sheet 12 for receiving a wiring harness 22 that has a plurality of electrical wires 24 and one or more electrical connectors 25. The channel 20 is generally U-shaped in cross section as shown in FIG. 3 and is sized to completely receive the wiring harness 22 so that an outer surface 26 of the wiring harness lies below the outer surface 14 of the mat. Although only a single channel 20 is illustrated, it is to be understood that multiple channels 20 can be molded into the planer sheet 12 for accommodating a corresponding number of wiring harnesses or wiring harness branches. The channel 20 can be curved as shown in FIG. 1 to circumvent molded protrusions (not shown) extending from the planer sheet 12, accessories extending through the mat and protrusions inside the passenger compartment extending either from or toward the vehicle firewall. Where possible, it is preferred that the channel 20 extends linearly along the planer sheet 12 to minimize the overall length of the wiring harness.

A fastener 30 is integrally molded with the planer sheet 12 at spaced locations for holding the wiring harness in the channel 20. Each fastener 30 includes a pair of fingers 32 formed on opposite sides of the channel 20. A free end 34 of the fingers 32 extend toward each other and upwardly from the upper surface 14, as shown most clearly in FIG. 2, to partially cover or overlie the channel opening. The free ends 34 are curved to facilitate insertion of the wiring harness into the channel. As the wiring harness is inserted into the channel, the outer surface 26 of the wiring harness contacts the free ends 34 of the fingers 32. The fingers flex away from each other until the outer surface 26 of the wiring harness clears the fingers and the wiring harness is seated in the channel. The fingers spring back to their original position over the channel opening to secure the wiring harness in the channel. The wiring harness in this manner is secured to the planer sheet 12 in a snap-fit engagement. The wiring harness can be easily removed from the channel by grasping and pulling the wiring harness until it clears the channel and fingers. A unique advantage of this arrangement provides the quick, consistent, and secure installation and removal of wiring harnesses without the additional labor, parts, and potential injury as in the prior art fastening arrangements.

Figure 5:
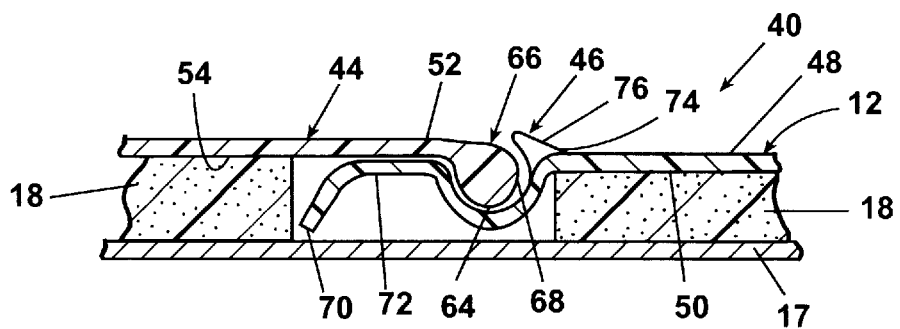
FIG. 5 is a cross-sectional view taken along line 5—5 of FIG. 4 illustrating the barrier plug snapped into the mat channel.
Figure 4:
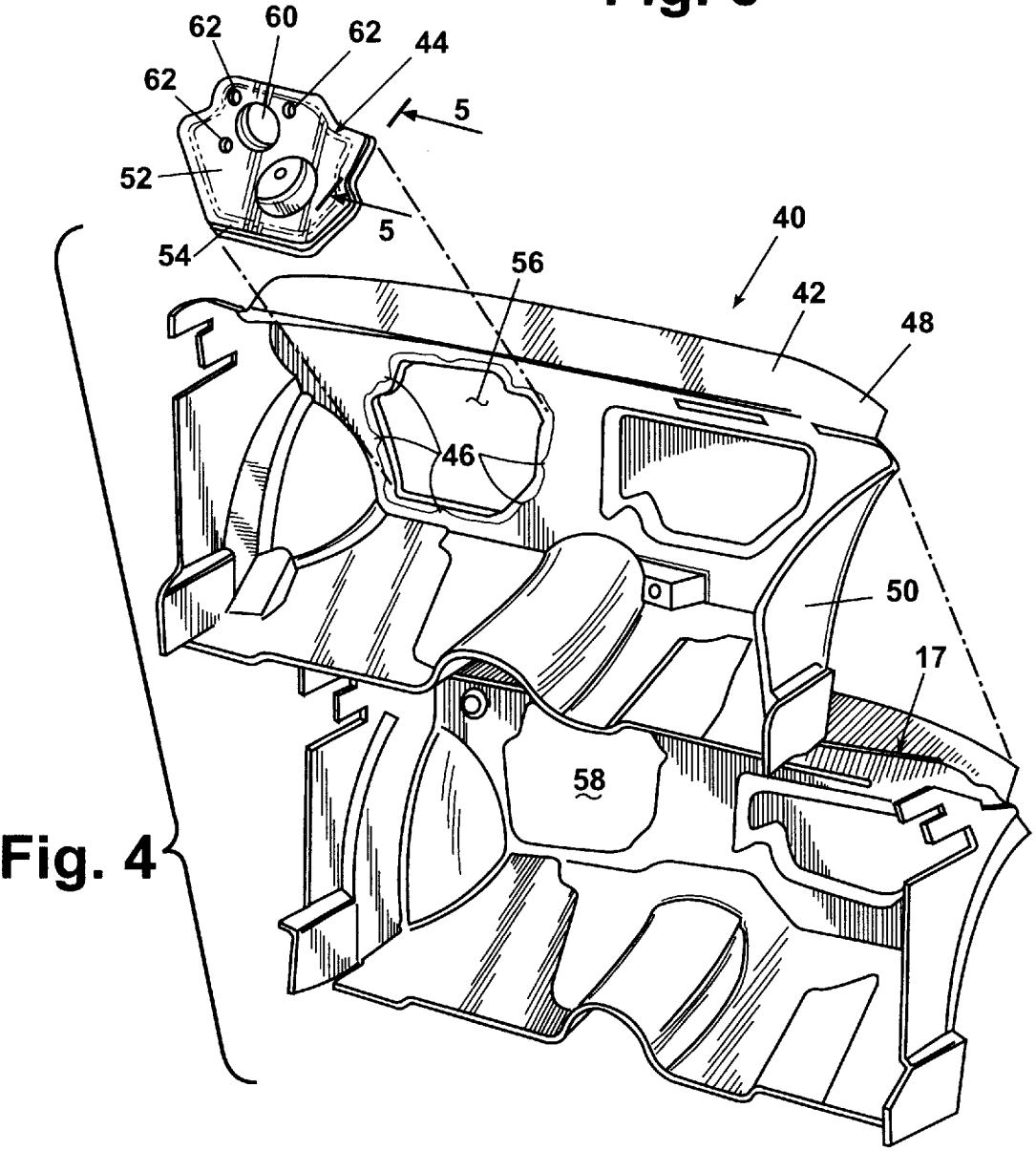
FIG. 4 is an exploded, perspective view of a vehicle firewall and dash mat assembly according to a second embodiment of the invention.

A second embodiment of a dash mat assembly 40 is illustrated in FIGS. 4 and 5, wherein like parts in the previous embodiment are represented by like numerals. The dash mat assembly 40 includes a dash mat 42 and a modular plate barrier 44 connected together with a fastener 46. The dash mat 42 and the modular plate barrier 44 are preferably formed of a filled, elastomeric, moldable polymer, e.g. elastomeric polypropylene, and serve as sound barrier layers to reduce the transmission of sound from the engine compartment through the firewall and into the passenger compartment of a vehicle. When the dash mat 42 overlays the firewall 17, a dash mat opening 56 substantially corresponds with a firewall opening 58. Both openings 56 and 58 form a passageway large enough for the subsequent installation of a steering column assembly (not shown). The steering column assembly is provided with the modular plate barrier 44 in a manner such that the steering column (not shown) passes through the steering column aperture 60 in the modular plate barrier 44 which also includes a plurality of mounting apertures 62. The modular plate barrier 44 is shaped to correspond to the openings 56 and 58 and is sized to overlap the dash mat 42. Upon installation of the steering column assembly, the modular plate barrier 44 is positioned correspondingly atop the dash mat 42 and fastened thereto with the integral fastener 46.

With particular reference to FIG. 5, which is a cross-sectional view of the dash mat assembly 40, the dash mat 42 includes an outer surface 48 and an inner surface 50. Likewise, the modular plate barrier 44 also includes an outer surface 52 and an inner surface 54. A foam layer 18 can be attached to the inner surfaces 50 and 54 and abut the firewall 17 when the dash mat assembly 40 is installed.

A peripherally extending plug 66 is integrally molded along the entire outer edge 68 of the modular plate barrier 44 to form a bulb-like protrusion of elastomeric material extending along the entire perimetric edge of the plate barrier 44.

An elongate channel 64 is molded into the dash mat 42 and extends along an entire outer edge 70 in a configuration to receive the peripherally extending plug 66 of the modular plate barrier 44. The channel 64 is generally U-shaped in cross section as shown in FIG. 5 and is sized to receive the plug 66 so that an outer surface 52 is substantially parallel to the outer surface 48. The channel 64 is interconnected to the outer edge 70 by an inverted U-shaped portion 72.

Multiple fasteners 46 are integrally molded with the mat 42 at spaced locations along the channel 64 for holding the modular plate barrier 44 in the channel 64. Each fastener 46 includes a finger 74 formed alongside the channel 64. A free end 76 of the finger 74 extends upwardly from the outer surface 48 and outwardly to partially cover the channel opening.

As the modular plate barrier 44 is inserted into the channel 64 and the peripherally extending plug 66 contacts the free ends 76 of the fingers 74. The fingers 74 flex until the plug 66 clears the fingers and is seated in the channel 64. The fingers 74 spring back to their original position over the channel opening to secure the plug 66 in the channel 64. In this manner, the modular plate barrier 44 is secured to the dash mat 42 in a snap-fit engagement. The outer surface 48 of the inverted U-shaped portion 72 of the dash mat 42 abuts the inner surface 54 of the modular plate barrier 44, and the outer edge 70 abuts the firewall 17. The modular plate barrier 44 can be easily removed from the channel 64 by grasping the plate and pulling it until the plug 66 clears the channel and fingers.

Figure 6:
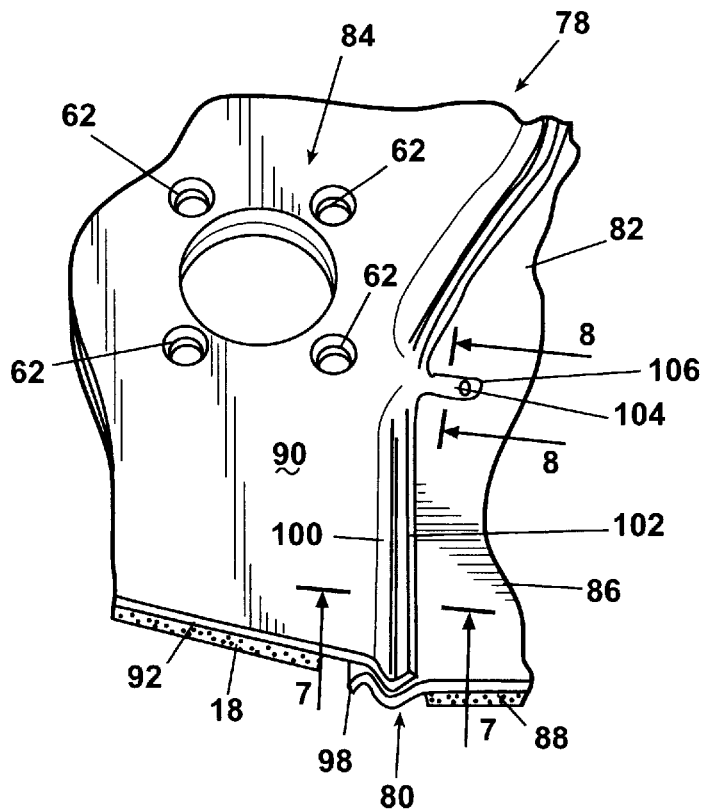
FIG. 6 is a sectional view of a dash mat assembly according to a third embodiment of the invention showing two pieces of dash mat fastened together.
Figure 7:
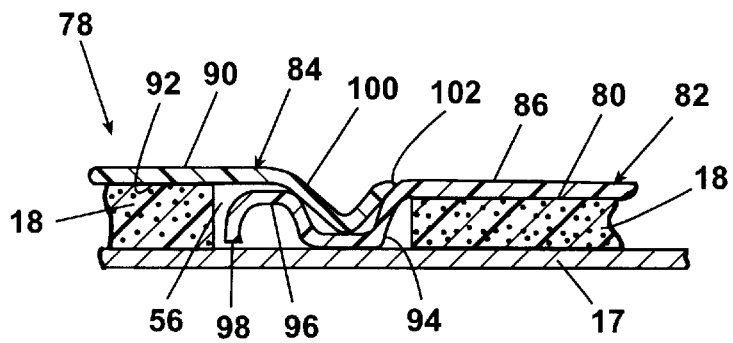
FIG. 7 is a cross-sectional view taken along line 7—7 of FIG. 6 illustrating the sealing engagement of the mat and barrier between molded projections.
Figure 8:
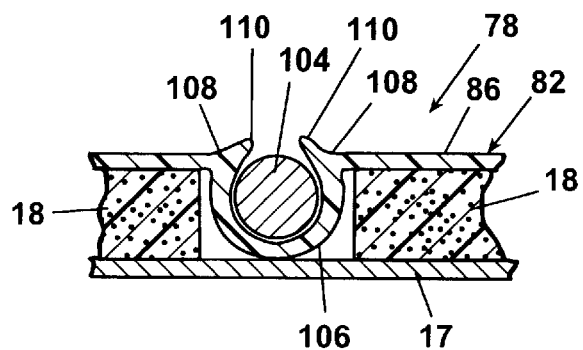
FIG. 8 is a cross-sectional view taken along line 8—8 of FIG. 6 illustrating the barrier projection snapped into the mat channel.

A third embodiment of a dash mat assembly 78 is illustrated in FIGS. 6–8, wherein like parts in the previous embodiments are represented by like numerals. The dash mat assembly 78 includes a dash mat 82 and a modular plate barrier 84 connected together with a fastener system 80 as shown in FIG. 6.

With particular reference to FIG. 7, which is a cross-sectional view of the dash mat assembly 78 taken along line 7—7, the dash mat 82 includes an outer surface 86 and an inner surface 88. Likewise, the modular plate barrier 84 also includes an outer surface 90 and an inner surface 92. A foam layer 18 can be attached to the inner surfaces 88 and 92 and abut the firewall 17 when the dash mat assembly 78 is installed.

The modular plate barrier 84 includes a substantially U-shaped portion 100 molded along the periphery of the barrier 84 and extending along a perimetric outer edge 102 of the plate barrier 84 as shown in FIG. 7.

The dash mat 82 includes a molded, U-shaped channel 94 interconnected to an inverted U-shaped portion 96. The channel 94 is molded along the periphery of the dash mat opening 56 and extends along an outer edge 98 with a configuration for receiving the U-shaped portion 100 of the modular plate barrier 84. When the modular plate barrier 84 is installed, the U-shaped portion 100 substantially conforms with the U-shaped channel 94. The inner surface 88 of the channel 94 abuts the firewall 17.

The fastener system 80 includes an integrally molded projection 104 and a correspondingly integrally-molded U-shaped channel 106, as shown in FIG. 6. Preferably, more than one projection 104 is formed in the modular plate barrier 84 which may contain a plurality of projections 104 at spaced locations to secure the barrier to the mat. The projection 104 is cylindrical and extends outwardly from the barrier parallel to the outer surface 90 and substantially perpendicular to the peripheral outer edge 102. The integrally-molded U-shaped portion 100 is interrupted where the projections 104 are located. In the corresponding location on the dash mat 82, a U-shaped channel 106 is molded in lieu of the channel 94 and inverted U-shaped portion 96. The U-shaped channel 106 extends inwardly into the dash mat 82 and substantially perpendicular to the outer edge 98. The channel 106 is sized for receiving the cylindrical projection 104.

With particular reference to FIG. 8, the fastener system 80 includes a pair of fingers 108 formed on opposite sides of the channel 106. The fingers 108 extend outwardly from the outer surface 86 of the dash mat 82 so that free ends 110 extend toward each other as shown in FIG. 8 to partially cover the channel opening. The free ends 110 are curved to facilitate insertion of the projection 104 into the channel 106. As the projection 104 is inserted into the channel 106, the projection contacts the free ends 110 of the fingers 108 which flex until the projection 104 clears the fingers and is seated in the channel 106. The fingers 108 spring back to their original position over the channel opening to secure the projection 104 in the channel 106. The modular plate barrier 84 in this manner is secured to the dash mat 82 in a snap-fit engagement. The modular plate barrier 84 can be removed from the channel by grasping and pulling it until it clears the channel 106 and fingers 108.

According to the invention, the modular plate barrier is attached to the dash mat so that the dash mat opening for receiving the steering column assembly is effectively sealed and the passenger compartment shielded from engine noise. The barrier is easily snapped into an overlaying engagement with the mat and retained thereto in a secure fashion. While the embodiments above have been described in connection with securing a modular plate barrier to the dash mat, it is to be understood that the invention is not necessarily so limited, and that the invention can be practiced where two pieces of dash mat are to be fastened together.

A unique advantage of the invention is that it provides a quick, consistent, and secure installation and removal of wiring harnesses, dash mat plugs, and the like without the additional labor and parts as in prior fastening arrangements.

While the invention has been described in connection with attaching a wiring harness to a sound barrier layer associated with a vehicle firewall, it is to be understood that the invention is not necessarily so limited, and that the invention can be practiced where an elongate object is to be fastened to a flexible material.

Reasonable variation and modification are possible within the spirit of the foregoing specification and drawings without departing from the scope of the invention.

What is claimed is:

1. A dash mat for a motor vehicle comprising a firewall separating an engine compartment and a passenger compartment in which is mounted a dashboard including a planar sheet having an elongated article, the dash mat comprising:

the planar sheet adapted to be mounted to the firewall to dampen sound passing from the engine compartment, through the firewall, and into the passenger compartment;

a channel formed in the planar sheet and sized to receive the elongated article; and a fastener comprising at least one finger integrally molded in the planar sheet and extending partially over the channel to hold the elongated article in the channel.

2. A dash mat according to claim 1, wherein the channel has a depth greater than the height of the elongated article so that the elongated article lies beneath an upper surface of the planar sheet.

3. A dash mat according to claim 2, wherein the fastener comprises a pair of resilient fingers positioned on opposite sides of the channel and extending over a portion of the channel.

4. A dash mat according to claim 3, wherein the pair of resilient fingers and the channel are integrally molded with the planar sheet.

5. A dash mat according to claim 1, wherein the channel has a cross-sectional shape generally conforming to the cross-sectional shape of the elongated article.

6. A dash mat according to claim 1, wherein the at least one finger is positioned on a side of the channel and extends over a portion of the channel and is resilient to releasably hold the elongated article within the channel whereby the elongated article can be inserted into the channel by pressing the elongated article against the finger, into the channel to deflect the finger, which then springs back to overlie and hold the elongated article within the channel.

7. A dash mat according to claim 6, wherein the fastener comprises two fingers juxtaposed to each other on opposite sides of the channel.

8. A dash mat according to claim 7, wherein the two fingers are integrally molded with the planar sheet.

9. A dash mat according to claim 1, wherein the channel is integrally molded in the planar sheet.

10. A dash mat according to claim 1, wherein the elongated article is a wiring harness.

11. In a motor vehicle comprising a firewall separating an engine compartment and a passenger compartment, a dash mat mounted to the firewall in the passenger compartment and an elongated article mounted to the dash mat including a planar sheet, the improvement comprising:

a channel formed in the planar sheet and sized to receive the elongated article; and a fastener comprising at least one finger integrally molded in the planar sheet and extending partially over the channel to hold the elongated article in the channel.

12. A motor vehicle and dash mat combination according to claim 11, wherein the channel has a depth greater than the height of the elongated article so that the elongated article lies beneath an upper surface of the planar sheet.

13. A motor vehicle and dash mat combination according to claim 12, wherein the fastener comprises a pair of resilient fingers positioned on opposite sides of the channel and extending over a portion of the channel.

14. A motor vehicle and dash mat combination according to claim 13, wherein the pair of resilient fingers and the channel are integrally molded with the planar sheet.

15. A motor vehicle and dash mat combination according to claim 11, wherein the channel has a cross-sectional shape generally conforming to the cross-sectional shape of the elongated article.

16. A motor vehicle and dash mat combination according to claim 11, wherein the at least one finger is positioned on a side of the channel and extends over a portion of the channel and is resilient to releasably hold the elongated article within the channel, whereby the elongated article can be inserted into the channel by pressing the elongated article against the finger, into the channel to deflect the finger, which then springs back to overlie and hold the elongated article within the channel.

17. A motor vehicle and dash mat combination according to claim 16, wherein the fastener comprises two fingers juxtaposed to each other on opposite sides of the channel.

18. A motor vehicle and dash mat combination according to claim 11, wherein the fingers are integrally molded with the planar sheet.

19. A motor vehicle and dash mat combination according to claim 17, wherein the channel is integrally molded in the planar sheet.

20. A motor vehicle and dash mat combination according to claim 11, wherein the elongated article is a wiring harness.

21. A mat having an elongated article mounted thereto, the mat comprising:
- a planar sheet having an elongated channel formed therein and sized to receive the elongated article; and
- a fastener comprising at least one finger molded in the planar sheet and extending partially over the channel to hold an elongated article in the channel.

22. A mat according to claim 20, wherein the channel has a depth greater than the height of the elongated article so that the elongated article lies beneath an upper surface of the planar sheet.

23. A mat according to claim 22, wherein the fastener comprises a pair of resilient fingers positioned on opposite sides of the channel and extending over a portion of the channel.

24. A mat according to claim 22, wherein the pair of resilient fingers and the channel are integrally molded with the planar sheet.

25. A dash mat according to claim 21, wherein the channel is integrally molded with the planar sheet.

* * * * *

UNITED STATES PATENT AND TRADEMARK OFFICE
CERTIFICATE OF CORRECTION

PATENT NO. : 6,092,854
DATED : July 25, 2000
INVENTOR(S) : Michael T. Campbell

Page 1 of 1

It is certified that error appears in the above-identified patent and that said Letters Patent is hereby corrected as shown below:

Column 8,
Line 11, "20" should read -- 21 --
Line 19, "22" should read -- 23 --
Line 23, "dash mat" should read -- mat --

Signed and Sealed this

Fourteenth Day of August, 2001

*Attest:*

*Attesting Officer*

NICHOLAS P. GODICI
*Acting Director of the United States Patent and Trademark Office*